Dec. 4, 1945.                    E. F. FLINT                    2,390,362
                              OPTICAL INSTRUMENT
                          Filed Dec. 30, 1942            2 Sheets-Sheet 1
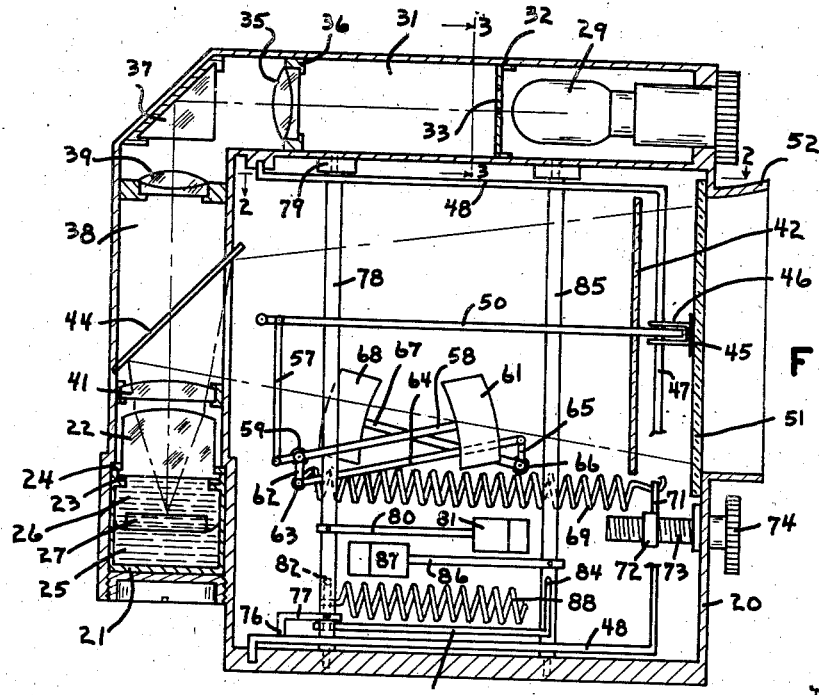
FIG. 1
FIG. 4
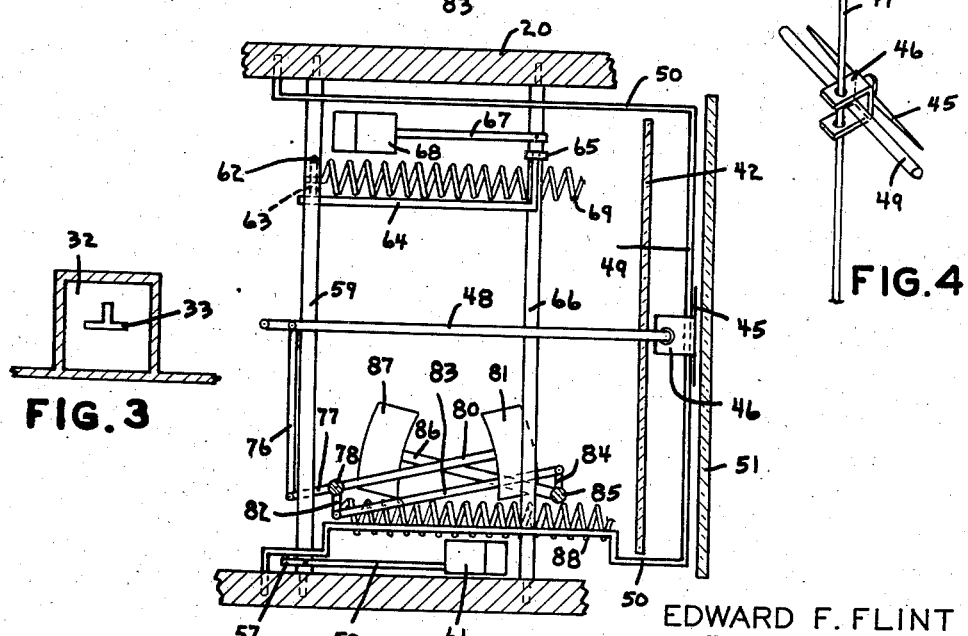
FIG. 3
FIG. 2
EDWARD F. FLINT
INVENTOR
BY
ATTORNEYS

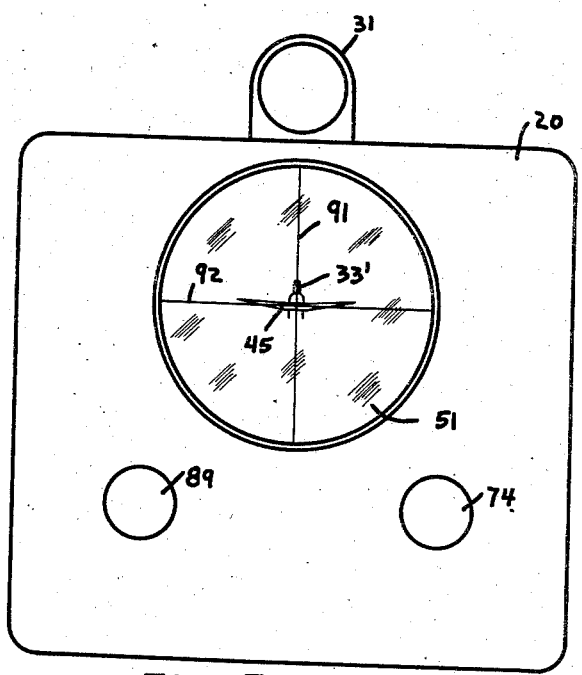
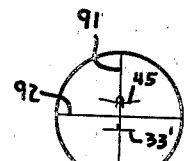
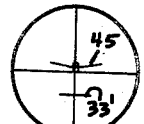
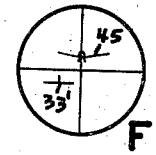
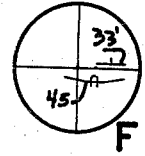
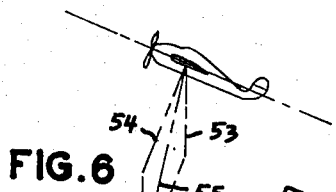
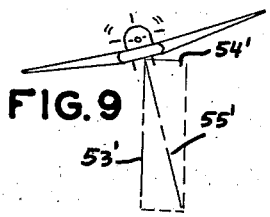
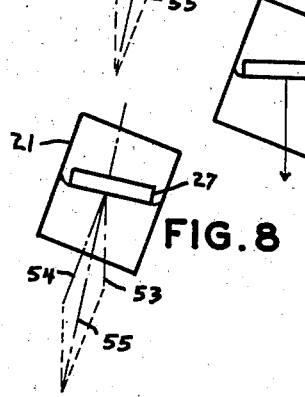
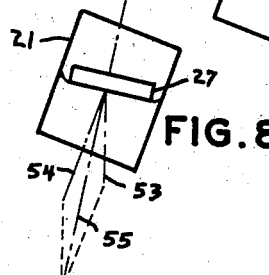
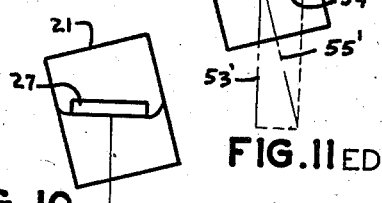
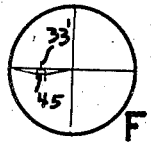
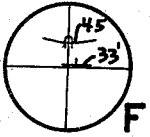

Patented Dec. 4, 1945

2,390,362

UNITED STATES PATENT OFFICE 2,390,362

OPTICAL INSTRUMENT

Edward F. Flint, Rochester, N. Y., assignor to Bausch & Lomb Optical Company, Rochester, N. Y., a corporation of New York Application December 30, 1942, Serial No. 470,533

11 Claims. (Cl. 88—24)

This invention relates to an optical instrument and more particularly to such an instrument for indicating certain acceleration forces acting on aircraft in flight and the effect of such forces on the aircraft.

The instrument of the present invention is particularly adapted to show the change in position of an aircraft relative to a datum line, preferably one simulating the real horizon. In the preferred embodiment of the invention, the datum line is established by means of a cell such as shown in my copending application Serial No. 456,888 filed September 1, 1942. The cell comprises a container having a transparent upper wall portion and is charged with approximately equal volumes of two immiscible liquids of different specific gravity.

In the form of the cell now preferred for use in the instrument of the present invention, the lighter of the liquids is transparent and as the upper wall portion of the cell is also transparent, a body supported by the heavier of the liquids is visible from the exterior of the cell adjacent the upper wall portion thereof.

The specific gravity of the body is less than the specific gravity of the heavier liquid but greater than the specific gravity of the lighter liquid and as the center of gravity of the body is placed downwardly from the actual center, the body will be supported by the heavier liquid in a predetermined position relative to the cell.

As the body will tend to remain in a horizontal position regardless of the position of the aircraft, the same may be used to establish the datum line in the instrument herein disclosed. To this end the body carries on the surface adjacent to the transparent liquid a reflecting surface which is used in the present invention to reflect an image of a suitable means fixed relative to the aircraft. An optical system projects the reflected image onto a suitable screen which has associated therewith an index means, preferably a replica of an aircraft, representing the aircraft on which the instrument is mounted.

Although gravity will tend to hold the body within the cell in a horizontal position regardless of the position of the aircraft, it is nevertheless affected by acceleration forces due to changes in attitude of the craft in flight and will be moved from its horizontal position by such forces. To compensate for the effect of such forces on the body, means actuated by these forces move the index means or replica and accordingly the index means or replica will move relative to the screen at the magnitude and direction of the movement of the projected image due to movement of the body relative to the aircraft as a result of the action of the acceleration forces.

As the position of the index means or replica will vary relative to the projected image as does the aircraft relative to the natural horizon, a pilot may through the instrument determine the attitude of the aircraft due to acceleration forces acting on the same.

The instrument is provided with horizontal and vertical reticules and as the index or replica will be moved by the acceleration forces relative to the reticules, a pilot will be apprised not only of his position relative to the predetermined datum line, but also the approximate extent or magnitude of the acceleration forces acting on the aircraft.

The instrument of the present invention, as it contains no gyroscope or other complicated mechanism, can be manufactured at a cost considerably smaller than gyroscopic instruments heretofore proposed. As the instrument does not use a gyroscope to stabilize the artificial horizon, it does not need the same supervision as do similar gyroscopic instruments and the instrument can be easily installed on the aircraft as the entire instrument is carried within a single casing.

Other features and advantages of the instrument of the present invention will appear from the following description taken in connection with the accompanying drawings in which:

Fig. 1 is a vertical section of the instrument of the present invention.

Fig. 2 is a section taken along line 2—2 of Fig. 1.

Fig. 3 is a section taken along line 3—3 of Fig. 1.

Fig. 4 is a fragmentary view in perspective of the support for the index.

Fig. 5 is a front view of the instrument of the present invention.

Fig. 6 is a schematic view of an airplane climbing with acceleration together with a diagram showing the direction and magnitude of the resulting force of gravity and the centrifugal force due to the change in direction of flight of the aircraft.

Fig. 7 is a diagrammatic view showing the position the body will assume if acted upon solely by gravity in a climbing airplane.

Fig. 8 is a diagrammatic view showing the position the body will assume if acted upon by the results of the several forces acting upon a climbing aircraft.

Fig. 9 is a schematic view of an aircraft in a bank together with a diagram showing the components of the resultant force.

Fig. 10 is a diagrammatic view showing the position the body will assume if acted upon solely by gravity in a banking aircraft.

Fig. 11 is a diagrammatic view showing the position the body will assume when acted upon by the results of the several forces acting on a banking aircraft.

Figs. 12 to 17 inclusive are diagrammatic showings of the indications given by the instrument of the present invention in different maneuvers of an aircraft.

The instrument of the present invention in the form now preferred, referring now to Fig. 1, comprises a casing 20 which is adapted to be mounted in the instrument panel of an aircraft. The casing supports a cell 21 comprising a tubular member, the lower end of which is closed by a transverse wall formed integral with the member. The opposite end of the cell 21 is closed and sealed by a lens element 22 secured in place on an internally formed annular seat by a gasket 23 and a locking ring 24.

The cell 21 is completely charged with approximately equal volumes of two immiscible liquids 25 and 26 of different specific gravity, the liquid 26 having a specific gravity less than the liquid 25. A small shell-like body 27, here shown as cylindrical in shape, is carried within the cell and as the specific gravity of the body 27 is less than the specific gravity of the liquid 25 and slightly greater than the specific gravity of the liquid 26, the body 27 will be supported by the heavier liquid 25 intermediate the upper and lower walls of the cell. The body carries the reflecting surface of the device of the present invention and, as now preferred, the reflecting surface is formed by evaporating chromium, aluminum, or some similar metal on the exterior surface of one wall of the body.

So that light rays emanating from a point exterior to the cell 21 may enter the same to be reflected by the reflecting surface of the body 27, liquid 26 in the embodiment of the invention illustrated is transparent and preferably has an index of refraction equal to that of the lens element 22.

It is now preferred to select a supporting l'quid which will wet the wall of the cell 21 and form a concave meniscus, as the meniscus is used in the present invention to center the body 27 relative to the wall of the cell 21. It will be seen, referring to Fig. 1, that if the diameter of the body is somewhat less than the interior diameter of the cell 21 the meniscus formed by the liquids 25 and 26 will be sufficient to hold the body away from the wall of the cell and center the same relative to the vertical axis of the same.

In the form of the invention illustrated as the instrument is to be used on an aircraft and will be carried within the aircraft to altitudes at which the temperature is below freezing of water, both liquids should have a freezing temperature sufficiently low to permit their use in this application of the cell 21.

It is desirable to form the body 27 so that the center of gravity will be lower than the physical center of the same. If the center of gravity is lower than the physical center of the same, the body will tend to maintain in a position at all times in which the reflecting surface faces the lens element 22 closing the open end of the cell. If the body 27 should become inverted, it will be righted by the ordinary vibrations and oscillations of the aircraft in flight.

The reflecting surface of the body 27 is used in the instrument of the present invention to reflect light rays from a fiducial means, and although the fiducial means may comprise any means desired, in the now-preferred form of the invention, this means comprises a light source such as an incandescent lamp 29 mounted in a tubular extension 31 carried by the casing at the top thereof and a diaphragm 32 transversely mounted in the extension 31 and formed with an elongated opening or slit 33. In the now-preferred form of the invention, the slit 33 is shaped in the form of an inverted T and permits light rays from the lamp 29 to pass to a projection lens system carried by the instrument.

The projecting system in the form now preferred, comprises a lens 35 mounted within the extension 31 by any mounting means desired such as the bezel ring 36. A prism 37 mounted at the junction between the extension 31 and a vertically extending tube 38 deflects the light rays to a lens 39 mounted by a ring similar to ring 36. The lens system 35 and 39 is adapted to form an image of the illuminated slit 33 in a plane somewhat above the plane of the reflecting surface of the body 27.

A lens system comprising the lens 41 and the lens element 22 of the cell 21 to some extent changes the position of the image projected by lens system 35 and 39, although the image is formed in a plane somewhat above that of the reflecting surface of the body 27.

It is desirable to have the image of the slit 33 formed on a screen 42 as this image is the image viewed by the pilot of the aircraft and in the use of the instrument of the present invention, indicates to the pilot the horizontal or artificial horizon. Thus the index of refraction of the lens system 22 and 41 and the optical surfaces thereof should be such relative to the index of refraction of the liquid 26, and the reflecting surface of the body 27 disposed at such a distance from the principal plane of the lens system, that the reflected real image of the slit 33 is projected by system 22 and 41 on a plane spaced from the plane of the lens system a distance equal to the distance between the principal plane of the lens system and the screen 42.

In the present invention, the reflected real image 33' of the slit is thrown onto the screen by means of a transparent reflector 44 diagonally mounted in the tube 38. Due to the particular arrangement of the optical surfaces and other optical characteristics of the system 22 and 41, the image of the slit 33 will be projected at an angle equal to half the angle of reflection. Thus the image as seen by an observer will move at the same speed as the reflecting surface of the body 27 tilts relative to the cell 21 in changes of attitude of the aircraft.

An index means representative of the aircraft itself is mounted on the instrument so as to be visible concurrently with the image 33'. This index means may consist of any means desired and in the preferred form of the present invention the means comprises a replica 45 of an aircraft disposed in front of the screen 42. The replica of the aircraft as best shown in Fig. 4 is carried by a U-shaped support 46 having openings formed adjacent the free ends thereof and slidably receiving the cross piece 47 of a yoke 48 having the opposite ends reversely bent and pivotally secured in the opposite walls of the casing 20. The cross piece 49 of a second yoke 50, having its ends pivotally mounted in opposite walls of the casing 20, is disposed between the bow of the U-shaped support 46 and the cross piece 47 of the yoke 48. Thus vertical movement of the cross piece 47 will move the replica vertically while horizontal movement of the cross piece 49 will move the replica horizontally, the play between the legs of the support 46 and cross piece 49 being sufficient to allow the replica to be moved over the area of the screen 42. As the cross pieces of the yokes 48 and 50 are disposed between the observer and image 33', they should be made as small as possible and of some suitable transparent material.

To protect the screen and replica 45, a transparent disc 51 is mounted in the front face of the instrument, which is provided with a hood 52 for shading the screen 42 to the end that the reflected image of the light slit 33 will be more visible thereon. The replica 45 can be illuminated by any conventional means now used to illuminate aircraft instruments.

Although the body 27 will tend to maintain a horizontal position regardless of the position of the aircraft, it is nevertheless affected by acceleration forces acting on the aircraft due to changes in attitude of the same. Thus, as diagrammatically shown in Fig. 6, an aircraft in changing its direction of flight from a level course to a climb is acted upon by a number of forces. In the schematic showing of Fig. 6, gravity is acting and is shown as force 53 of the force diagram illustrated while centrifugal force due to the change in direction of the aircraft is shown at 54. The resultant of the forces 53 and 54 is shown at 55. The resultant 55, theoretically, should act substantially normal to the longitudinal axis of the aircraft but in actual flight, due to the increase in the angle of attack of the airfoil, the resultant force is shifted aft an angle equal to the change in the angle of attack of the airfoil.

It will be understood that the cell 21 of an aircraft in a climb as illustrated in Fig. 6, will assume a position such as shown in Fig. 7 and that gravity will tend to hold the body 27 horizontal. The resultant force 55, however, will move the body 27 relative to the cell 21 to that position shown in Fig. 8, which results in a vertical displacement of the image on the screen 42. If the aircraft banks as shown in Fig. 9, the resultant force 55' from the force of gravity 53' and the centrifugal force 54' will move the body 27 from its horizontal position of Fig. 10 to that shown in Fig. 11. This movement of the body 27 results in horizontal movement of the image 33' on the screen 42.

These movements of the body 27 will displace the image 33' on the screen and unless some correction is applied, the relative positions of the image 33' and the replica 45 would erroneously indicate the actual position of the aircraft relative to the real horizon.

To compensate for the effect of forces on the body 27, the present invention provides a compensating means for changing the position of the replica 45 in response to the forces changing the position of the body 27. Although the compensating means may comprise any means for accomplishing the desired results, in the preferred embodiment of the present invention, this means comprises, referring now to Figs. 1 and 2, mechanism for moving the yokes 48 and 50. In the form of the mechanism as now preferred, the one end of a link 57 is pivotally connected to the yoke 50, adjacent the one supported end thereof, the opposite end of the link being pivotally connected to one end of a lever 58. The lever 58 adjacent the pivotal connection to the link 57 is rigidly fixed to a rod 59 having the opposite ends thereof rotatably mounted in opposite side walls of the casing 20. The lever 58, fixed to the rod 59 adjacent the one end of the same, carries a weight 61 at the free end thereof.

The rod 59 is formed adjacent the opposite end thereof with a short arm 62 preferably formed integral therewith and provided with a finger 63, the free end of which is pivotally connected to an elongate L-shaped link 64. The short leg of the link 64 extends substantially parallel to the rod 59 and is pivotally connected to a stub arm 65 preferably formed integral with a horizontal rod 66 having the ends thereof rotatably mounted in opposite side walls of the casing 20. The rod 66 is provided with a lever 67 extending toward the rod 58 which lever carries a weight 68 at the end adjacent the rod 58.

To counterbalance the weights 61 and 68, a coiled spring 69 has one end secured to the finger 63 of the arm 62 and the opposite end to a finger 71 formed integral with a nut 72 mounted on the threaded stud 73, rotatably carried in a suitable opening in the front wall of the casing 20. Any means desired may be provided for holding the nut against the rotation when the stud is rotated by means of the knurled knob 74 carried by the protruding end of the stud. As the tension of the spring 69 determines the position of the weights 61 and 68, the position of the same can be adjusted by varying the tension of the spring by rotating the stud 73 through the knurled knob 74.

In the use of the instrument, the tension of the spring is adjusted until the yoke 51 locates the index replica 45 in the position shown in Fig. 5.

If in the flight of the aircraft, it is put into a maneuver or forced into such an attitude that the resultant force causes the body 27 to move out of its normal horizontal position and thus move the artificial horizon image 33' on the screen 42, the inertia of the weights 61 and 68 will cause the same to move relative to the casing 20 and rotate the rods 59 and 66. This rotational movement of the rods through the interconnecting links and arms will cause the yoke 50 to move the replica 45 in the direction of and proportional to the acceleration of the aircraft itself. Thus if the aircraft is accelerated upwardly, the weights 61 and 68 will tend to move downwardly due to the inertia thereof and this movement of the weights 61 through link 57 will cause the yoke 50 to move upwardly. The corresponding movement of the weights 68 through the arm 65, L-shaped link 64, and arm 62, will also rotate the rod 59 to add another component of upward force against the link 57, which force is in turn transmitted to the yoke 50. Accordingly, as the image of the artificial horizon is moved upwardly on the screen 42, the replica 45 will tend to follow the image so that the relative displacement of the image and replica remains substantially the same.

The yoke 48 controlling horizontal movement of the replica is governed by a similar system of weights and linkages held in balance by a spring similar to the spring 69. The yoke 48, referring now to Fig. 2, is pivotally interconnected by a link 76 to one end of an arm 77 rigidly carried by a vertical rod 78 having the lower end thereof rotatably mounted in the bottom wall of the casing 20 and the upper end thereof rotatably mounted in a bearing 79 carried by the top wall of the casing 20. A lever 80 having one end fixed to the rod 78 carries at the opposite end thereof a weight 81. A link 82 rigidly secured at one end to the rod 78 is formed with a laterally extending portion pivotally connected at the free end thereof to one end of an elongate L-shaped link 83. The opposite end of the link 83 is pivotally connected to the free end of an arm 84 rigidly extending from a vertically disposed rod 85 mounted as is rod 78. A lever 86 rigidly fixed at one end of the rod 85 carries a weight 87 at the opposite end thereof.

To counterbalance the weights 81 and 87, a coiled spring 88 has one end secured to the laterally extending portion of link 82 and the opposite end secured to a finger formed integral with a nut mounted on a threaded stud rotatably carried by the front wall of the casing 20. For the purpose of clarity this end of the spring, the mounting finger, and the adjusting nut, have not been shown in the drawings. They are identical with spring 69, finger 71, nut 72 and stud 73 described in connection with the description of the compensating means for the vertical forces. The stud is formed with a knurled head 89 to permit the spring to be adjusted in the same manner as the spring 69 is adjusted.

It will thus be seen that the index formed by the replica 45 is compensated for both horizontal and vertical acceleration forces and is free to move over the screen 42, in accordance with the direction and magnitude of the acceleration forces acting on the aircraft in flight.

It will now be seen that the instrument is subject to substantially all forces acting on the aircraft and will indicate to the pilot the attitude of the latter relative to the real horizon. The instrument not only advises the pilot of his position relative to the real horizon but also the approximate value of the accelerating forces acting on the aircraft for the screen 42 is formed with reticules 91 and 92 and it will be seen that the displacement of the index replica 45 relative to the reticules 91 and 92 will indicate the magnitude of the acceleration forces. Accordingly, the instrument may be classified as an accelerometer as well as a bank and turn indicator.

In the use of the device of the present invention, after the springs have been adjusted no further adjustment is necessary as in some previously proposed instruments equipped with a gyroscope. As the instrument will respond immediately to the forces of gravity and acceleration, there is furthermore no lag as in prior gyroscopic instruments.

There is shown in Figs. 12 through 17 a number of indications typical of the changes in attitude possible with an aircraft. It will be understood that in normal level flights the replica 45 and the image 33' will coincide on the screen 42 as shown in Fig. 5. If the aircraft is put into a climb, such as schematically shown in Fig. 6, the replica 45 and image 33' will assume the relative positions as shown in Fig. 12, but after the aircraft is in the climb and is no longer changing its direction of flight, the instrument will indicate this maneuver somewhat as shown in Fig. 13. If the aircraft is brought out of the climb as indicated by the instrument in Fig. 13 with a climbing turn to the right, the angular position of the aircraft will cause the replica 45 and image 33' to separate horizontally as shown in Fig. 14.

Fig. 15 shows the relative position of the replica and image when the aircraft is in a left slip while Fig. 16 shows the indication of the instrument when the aircraft is in a right skid and not banking while in this maneuver. Fig. 17 shows the indication which will be given by the instrument when the airplane is maneuvering a left turn with bank. The position of the image 33' and replica 45 will, of course, vary in this maneuver, depending upon the angularity of the turn and the degree of the bank.

It should be understood now that if the airplane is put into a dive, the indications of the instrument will be somewhat the reverse of those shown in Figs. 12 and 13, depending upon whether or not the aircraft is subject to acceleration forces while in the dive.

It will be seen now that other maneuvers will bring about different indications of the instrument and the pilot will be aware at all times of the attitude of his ship relative to the real horizon. As the displacement of the replica and image on the screen 42 depends on the extent and direction of the acceleration forces, the instrument will also graphically tell him the value of the acceleration forces. It is to be understood, however, that the instrument is not capable of all the observations possible with gyroscopic instruments heretofore proposed. The instrument of the present invention is designed more for a private plane rather than a highly maneuverable combat plane.

The instrument herein disclosed can be manufactured at a cost considerably smaller than gyroscopic instruments furnishing the same service to a pilot and as it contains no gyroscope or other complicated mechanisms, it does not need the same supervision as do gyroscopic instruments. The instrument of the present invention furthermore is easily installed on the aircraft as the entire instrument can be carried within the casing 20.

While the present preferred embodiments of the invention have been illustrated and described herein, it is to be understood that the invention is not limited thereby but is susceptible of changes in form and detail within the scope of the appended claims.

I claim:

1. In an aircraft instrument of the type described, means for forming a fiducial means to indicate true horizon, said first-named means including a reflector stabilized only by gravity in a predetermined position and free to move in response to accelerating forces acting on the aircraft; means for projecting an image of said fiducial means on said screen; an index means representing the aircraft mounted in front of said screen; means for mounting said index means for movement in front of said screen in response to movements of the aircraft; and means for moving said index means in response to accelerating forces acting on said aircraft to compensate for movement of said reflector by said forces.

2. In an aircraft instrument of the type described, means for forming a fiducial means, said first-named means including a reflector normally held by gravity in a horizontal position and movable in response to accelerating forces acting on the aircraft; means for projecting an image of said fiducial means on said screen; an index means representing the aircraft and movable in response to inclinations thereof; means for mounting said index means for movement in front of said screen to cooperate with the image of the fiducial means; means for moving said index means in response to accelerating forces acting on said aircraft to compensate for the action of said forces on said reflector; and means for graphically showing the magnitude of said forces.

3. In an aircraft instrument of the type described, means for forming a fiducial means; said first-named means including a reflector supported by a caged volume of a liquid so that said reflector is normally held in a horizontal position; means for projecting an image of said fiducial means on said screen; an index means representative of the aircraft; means for mounting said index means for movement in front of said screen; and means for moving said index means in response to accelerating forces acting on said aircraft to compensate for the action of said forces on said reflector.

4. In an instrument of the type described, a reflector; means for normally holding said reflector in a horizontal position; a fiducial means; a screen; means for projecting a reflected image of said fiducial means onto said screen; a movably mounted index means adjacent said screen; and means for controlling the position of said movably mounted index means relative to said screen, said means comprising weight-operated link mechanism for moving said index means proportional to acceleration forces causing displacement of said reflector from its normal position.

5. In an instrument of the type described, a casing; a cell containing two immiscible liquids of different specific gravity, the lighter of said liquids being transparent; a body supported by the heavier of said liquids; a reflecting surface on said body adjacent the transparent liquid; fiducial means; a screen; means for projecting the reflected image of said fiducial means onto said screen; movably mounted index means associated with said screen; and means for moving said index means in proportion to the forces acting on said instrument.

6. In an aircraft instrument of the type described, a cell completely charged with substantially equal volumes of two immiscible liquids of different specific gravities, at least the lighter of said liquids being transparent; fiducial means mounted above said transparent liquid; a reflector supported by the heavier of said liquids and facing said fiducial means; means between said fiducial means and said reflector for projecting the reflected image of said fiducial means to a plane spaced from said reflector; light-dividing means intermediate said projecting means for deflecting the optical path of said image; a screen in the deflected path for receiving the image of the fiducial means; means for indicating on said screen the position of said aircraft relative to the projection image of said fiducial means; and means for varying the position of said indicating means to compensate for acceleration forces acting on said reflector.

7. In an instrument of the type described, a reflector; means, including liquid supporting means, for normally holding said reflector in a horizontal position; fiducial means mounted in optical alignment with said reflector; a screen; means for projecting the reflected image of said fiducial means onto said screen; an index means; means for mounting said index means for movement over said screen whereby the position of the same relative to said image may be noted; and means for moving said index means in response to acceleration forces causing displacement of said reflector from its normal position.

8. In an instrument of the type described, a reflector; means, including liquid supporting means, for normally holding said reflector in a horizontal position; fiducial means mounted in optical alignment with said reflector; a screen; means for projecting the reflected image of said fiducial means onto said screen; an index means; means for mounting said index means for movement over said screen whereby the relative positions of the same and said image may be noted; at least one weighted arm pivoted for horizontal movement; at least one weighted arm pivoted for vertical movement; link mechanisms connecting said weighted arms with said index means; and means for normally holding said index means in a predetermined position relative to said screen, said weighted arms and said link mechanisms moving said index means in response to acceleration forces causing displacement of said reflector from its normal position.

9. In an aircraft instrument of the type described, a container completely charged with equal volumes of two immiscible liquids, one of said liquids having a specific gravity less than the other liquid, the lighter of said liquids being transparent, said container having a transparent wall portion adjacent said transparent liquid; a reflector supported by the heavier of said liquids; fiducial means in optical alignment with said reflector; a screen; means for projecting an image of said fiducial means on said screen; an index means representing the aircraft mounted in front of said screen; and means for moving said index means in response to acceleration forces acting on said aircraft to compensate for the action of said forces on said reflector.

10. In an aircraft instrument of the type described, a container completely charged with equal volumes of two immiscible liquids, one of said liquids having a specific gravity less than the other liquid, the lighter of said liquids being transparent, said container having a transparent wall portion adjacent said transparent liquid; a reflector supported by the heavier of said liquids; fiducial means in optical alignment with said reflector; a screen; means for projecting an image of said fiducial means on said screen; index means representative of the aircraft; means for mounting said index means for movement over the front of said screen whereby said image and said index means are concurrently visible; means responsive to horizontal acceleration forces for horizontally moving said index means relative to said screen; and means responsive to vertical acceleration forces for vertically moving said index means relative to said screen, said mounting means being so formed that said index means may be simultaneously moved horizontally and vertically by said force responsive means.

11. An aircraft instrument for indicating the attitude of aircraft in flight comprising a screen, fiducial means for indicating true horizon, projecting means for projecting an image of the fiducial means onto the screen, said projecting means including a reflector mounted to move in response to accelerating forces acting on the aircraft and being normally stabilized by gravity in the absence of such forces, index means movably mounted to be responsive to inclinations of the aircraft, said index means representing the aircraft and positioned adjacent the screen in cooperative relation with the projected image of the fiducial means, and means for moving the index means relative to said projected image and in response to accelerating forces acting on the aircraft to compensate for movement of the reflector by said forces whereby the instrument will indicate the attitude of the aircraft relative to the true horizon.

EDWARD F. FLINT.